United States Patent [19]
Rourke

[11] Patent Number: 5,497,671
[45] Date of Patent: Mar. 12, 1996

[54] PINEAPPLE GEAR AND METHOD OF MANUFACTURING THE SAME

[76] Inventor: Edward G. Rourke, 20705 Cheney Dr., Topanga, Calif. 90290

[21] Appl. No.: 190,390

[22] Filed: Feb. 2, 1994

[51] Int. Cl.$^6$ ..................................................... F16H 1/12
[52] U.S. Cl. .................. 74/416; 74/84 R; 74/415
[58] Field of Search ........................... 74/415, 416, 84 R; 409/132

[56] References Cited

U.S. PATENT DOCUMENTS

| | | | |
|---|---|---|---|
| Re. 22,555 | 10/1944 | Brooks | 74/416 |
| 498,552 | 5/1893 | Hunt | 74/415 |
| 602,629 | 4/1898 | Seger | 74/416 |
| 705,624 | 7/1902 | Stokes | 74/416 |
| 1,031,764 | 7/1912 | Wright | 74/84 |
| 2,933,954 | 4/1960 | Claud-Mantle | 74/415 |
| 3,075,397 | 1/1963 | Winter | 74/415 |
| 3,495,470 | 2/1970 | McCartin | 74/415 |
| 3,661,028 | 5/1972 | Fuchs | 74/416 |
| 4,167,127 | 9/1979 | Calvert | 74/416 |
| 4,602,527 | 7/1986 | Tamiya | 74/713 |
| 4,624,610 | 11/1986 | Phillips et al. | 409/132 |
| 5,197,354 | 3/1993 | Mohr et al. | 74/820 |

FOREIGN PATENT DOCUMENTS

| | | | |
|---|---|---|---|
| 149799 | 5/1937 | Australia . | |
| 286415 | 1/1991 | U.S.S.R. | 74/416 |

Primary Examiner—Rodney H. Bonck
Assistant Examiner—Chong H. Kim
Attorney, Agent, or Firm—Daniel L. Dawes

[57] ABSTRACT

A gear combination is disclosed in which a spherical body has a plurality of grooves defined therein into which a pin gear enmeshes. Substantially all the pins on the pin gear engage the grooves in the spherical body at all times. The spherical body rotates about a first axis and the pin gear rotates about a second axis. The grooves are cut into the spherical body by a computer-controlled milling machine. The groove is endless or eventually returns to its beginning position. The axis of the milling tool may be oriented at any angle with respect to the axis of the lathe head, since the resulting motion of the milling tool necessarily cuts whatever lissajous shape is dictated by the relative periodic motions of the lathe head and milling table. The pins in the pin gear thus follow the grooves defined in the spherical body so that the rotation of the pin gear relative to the spherical body mimics the relative motions of the lathe head and milling table when the spherical body was cut.

20 Claims, 7 Drawing Sheets

PINEAPPLE GEAR AND METHOD OF MANUFACTURING THE SAME

BACKGROUND OF THE INVENTION

1. Field of the Invention

The invention relates to the field of gears and in particular, to angled gears where in addition to gearing ratios, an angle is provided between axes of rotation of the driving and driven gears is realized.

2. Description of the Prior Art

Gear combinations for providing gear ratios and changes in the direction of the axis of rotation are well known to the art and are generally realized through various types of bevel gears. Examples of such bevel gears can be found in many application, such as shown in Calvert, "Angle Meshing Gear," U.S. Pat. No. 4,167,127 (1979). Such right angle gearing has also been employed in a number of applications in which one of the gears is a toothed gear, having a pin gear with a plurality of circumferentially spaced studs or pins instead of a shaped gear tooth. Examples of pin gears can be found, for example, in Sager, "Angle Gearing," U.S. Pat. No. 602,629 (1898); Tamiya, "Differential Gearing," U.S. Pat. No. 4,602,527 (1986); and Brooks, "Power Transmission Means," Reissue 22,555 (1944). The use of pin gears in combinations with various types complex machined grooves can be found in McCartin, "Spherical Thread and Pin Gear Reduction," U.S. Pat. No. 3,495,470 (1970); Claud-Mantle, "Indexing Mechanism," U.S. Pat. No. 2,933,964 (1960); Hunt, "Rotary Cam Gear," U.S. Pat. No. 498,552 (1893); Winter, "Multiple Speed Gear Transmission and Tooth Construction," U.S. Pat. No. 3,075,397 (1963); and Koll, "Stufengetriebe," Austrian Patent 149,799 (1937). Pin gears have also been used in hybrid pin and hole combinations such as shown by Fuchs, "Coacting Pin-in-Hole Gears," U.S. Pat. No. 3,661,028 (1972).

The use of gear-like structures in dish-shaped or doorknob-shaped bodies are also illustrated in the application of Stokes et al, "Motion Transmitting Device," U.S. Pat. No. 705,624 (1902); and Mohr et al, "Angular Drive Intermittent Motion Mechanism," U.S. Pat. No. 5,197,354 (1993).

Each of these pin gear combinations have various advantages and disadvantages, but they all share in common a certain bulkiness which makes their use in applications where compactness or size limitations are a critical requirement difficult. In order to make such gearing combinations useful in such applications, their overall size must be reduced. If the size is reduced, then the structural elements of the gearing combination similarly are reduced in size and hence strength. The use of such gearings in small spaces in, for example, small motors, wherein the gearing must be rugged and driven at high speed with relatively substantial forces in torques becomes problematic.

Often such pin gear combinations do run smoothly due to the fact that at any one instant only a few pins are fully or even partially engaged.

In addition, if different gearing ratios are required, it is usually necessary to change the size of at least one of the gears and hence the volume which the gear combination occupies.

Therefore, what is needed is some type of a pin gear combination which allows different gear ratios to be realized between the gears in the combination and also a change of direction between the driving and driven shaft angles that can be used in applications where space is a limitation or is fixed, and which runs smoothly.

BRIEF SUMMARY OF THE INVENTION

The invention is a gear combination for rotating a first shaft with respect to rotation of a second shaft. The first and second shafts each have an axis of rotation. The axes of rotation intersect each other at an angle. The gear combination comprises a pin gear coupled to the first shaft and having a first diameter. The pin gear has at least one pin extending therefrom. An at least partially spherical body has at least one or more lissajous groove defined in the spherical body and has a second diameter, which groove is arranged and configured for engagement with the pin of the pin gear. The spherical gear is coupled to the second shaft. The term "lissajous" as used to describe a groove or motion is defined for the purposes of this specification to include not only the result of periodic motion around multiple axes, but also partially periodic motions about multiple axes, which motions may stop, reverse or change their frequency or periodicity in time. All that is necessary is that the multiple axes motions are sufficiently periodic with each other to ulimately bring the pin back to its intial starting position, or even more broadly that the grooves define in some manner an endless path of travel for the pin.. Any path, groove or motion which satisfies this condition shall be termed as a lissajous path, groove or motion. The relative motions of the pin gear and pineapple gear may be arbitrary as long as they define in some manner an endless path, or a closed loop of finite length of some kind.

The diameters of the spherical body and of the pin gear may be unequal to define a torque conversion between the pin gear and the spherical body. The lissajous groove defines a gear ratio between the pin gear and the spherical body. The angle between the first and second shafts is arbitrary. The pin gear has a plurality of pins, a plurality of lissajous grooves, and substantially all of the plurality of pins are always in engagement with the lissajous grooves defined in the spherical body.

The invention is also alternatively defined as a gear combination for rotating a first shaft with respect to rotation of a second shaft. The first and second shafts each have an axis of rotation. The axes of rotation intersect each other at an angle. The gear combination comprises a pin gear coupled to first shaft. The pin gear has a plurality of pins extending therefrom. A spherical gear, which is comprised of an at least partially spherical body and a plurality of grooves defined in the spherical body, is coupled to the second shaft. The grooves are arranged and configured to engage the plurality of pins of the pin gear. As a result, a compact gear combination is provided and an arbitrary angle between the first and second shafts is established.

In the illustrated embodiment the angle between the first and second shaft is a right angle. Each of the grooves defined in the spherical body receives at least two of the pins of the pin gear. The grooves are defined in the spherical body such that the spherical gear rotates an integral number of times for an integral number of rotations of the pin gear.

In another embodiment providing a Geneva mechanism, at least a portion of the grooves defined in the spherical body are perpendicular to the axis of the second shaft so that the pin gear partially rotates with each full rotation of the spherical gear. The partial rotation of the pin gear with rotation of the spherical gear is a rational fraction of a single revolution of the pin gear for each revolution of the spherical gear.

Preferably, substantially all of the plurality of pins are in engagement with the grooves in the spherical body at all times to provide a smooth action. Typically, the pin gear is a driven gear and the spherical gear is a driving gear, but the reverse may be true as well if the torque and gear ratios are appropriate.

In another embodiment the spherical body is provided with an end disk. The end disk is shaped to define one wall of at least one of the grooves.

The gear combination is fabricated in a four axis machine tool having a computer controlled fourth axis lathe head on the table of a vertical mill. A milling tool is mounted on the milling head above the table. The milling head can be translated in three directions. Below the milling head is a table for mounting the workpiece. The table and lathe head connected to it can be independently translated in two horizontal orthogonal directions as a body under computer control. Therefore, the milling table and lathe head can be controllably orbited around a vertical axis. The grooves are defined in the spherical body by rotating the spherical body about an axis collinear to the axis of the second shaft while the milling table is synchronously orbited as controlled by the computer. The milling tool is independently operated to define or machine the grooves in the spherical body.

The invention is also a method for fabricating a gear combination comprised of a pin gear rotating about a first axis of revolution and a spherical gear rotating about a second axis of rotation. The method comprises the steps of orbiting a milling table about the first axis of rotation. The spherical body is rotated in a lathe head about the second axis of rotation. The milling head is oriented relative to the lathe head so that the first and second axes of rotation are angled with respect to each other at an arbitrary, but predetermined angle with respect to each other. A milling tool is provided on the milling head. The milling tool is operated to define grooves into the spherical body. The rotation of the lathe head and the orbiting of the milling table are synchronized. As a result, a compact gear combination is provided with arbitrarily angled first and second axes of rotation.

In the illustrated embodiment the step of orienting the milling head with respect to the lathe head orients the first axis of alignment of the milling head at right angles to the second axis of rotation of the lathe head.

The step of operating the milling tool to define grooves defines endless grooves in the spherical body. After the step of operating the milling tool to define a first one of the endless grooves in the spherical body, the lathe head is indexed to define a second endless groove in the spherical body.

The milling table orbits about the first axis rotation in a first sense. The first sense is either clockwise or counterclockwise. The lathe head rotates about second axis rotation in a second sense. The second sense is clockwise or counterclockwise. The sense of movement or orbit of the milling table about the first axis of rotation and the lathe head about the second axis of rotation can be in the same sense or in opposite senses as desired.

The invention may be better visualized by now turning to the following drawings wherein illustrated embodiments have been set forth and wherein like elements are referenced by like numerals.

The invention and its various embodiments may now be better understood by turning to the following detailed description.

DETAILED DESCRIPTION OF THE PREFERRED EMBODIMENTS

A gear combination is disclosed in which a spherical body has a plurality of grooves defined therein into which a pin gear enmeshes. Substantially all the pins on the pin gear engage the grooves in the spherical body at all times. The spherical body rotates about a first axis and the pin gear rotates about a second axis.

Figure 6:
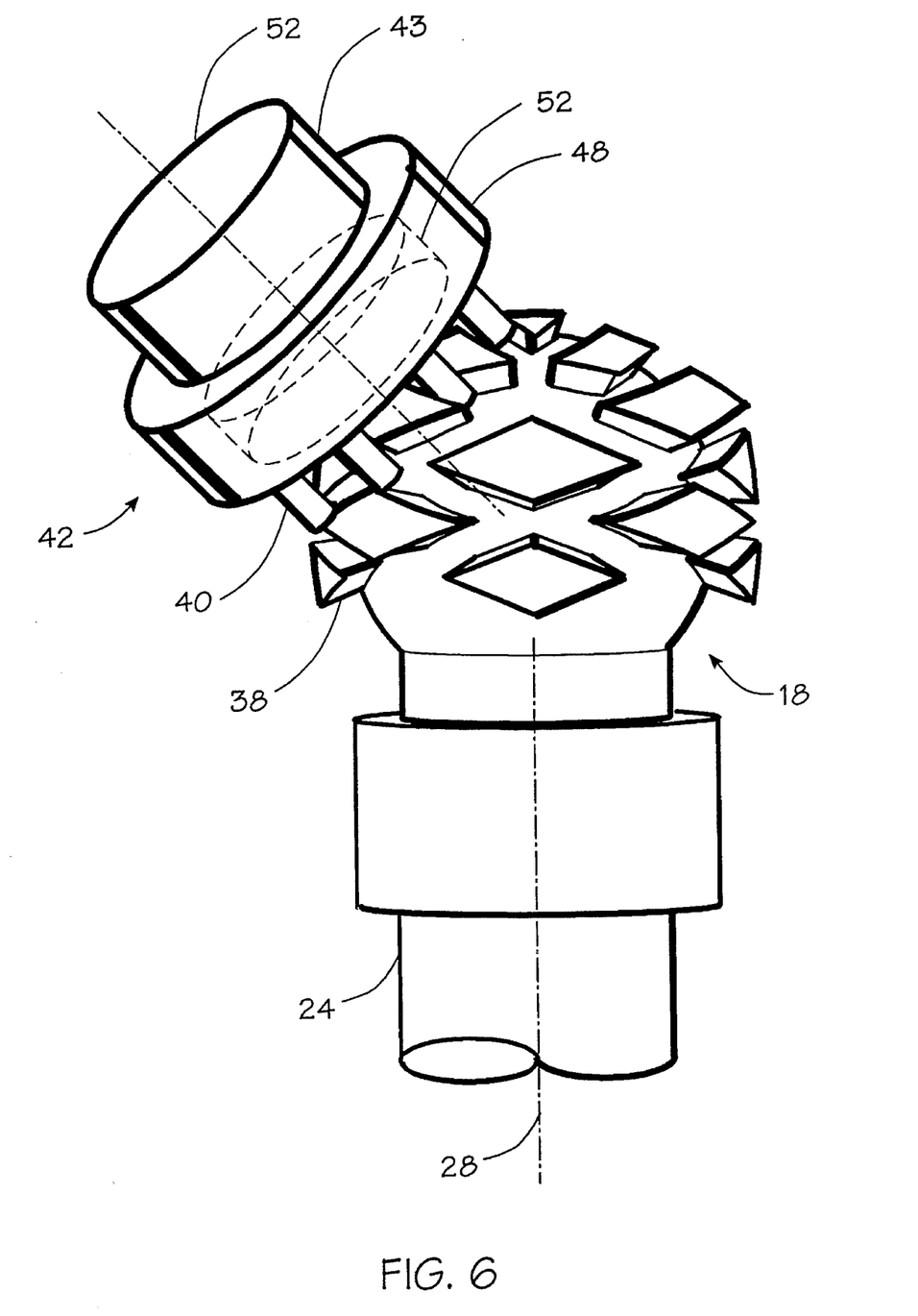
FIG. 6 is an elevational side view of a gear combination in which the gears are disposed at an angle other than 90 degrees.

The grooves are cut into the spherical body by means of computer-controlled milling machine. The milling machine has a lathe head which rotates the spherical body about the first axis. A milling head carries a milling tool which is rotated by a motor to cut the grooves into the spherical body. The milling table and lathe head are synchronously orbited or rotated, respectively, with respect to each other as controlled by a computer program, while the milling tool on the fixed milling head cuts an endless groove in the spherical body. The groove is guaranteed to be endless or eventually returned to its beginning position by synchronously maintaining the rotation of the lathe head and orbiting of the milling table in a rational ratio. The axis of the milling tool may be oriented at any angle with respect to the axis of the lathe head, since the resulting motion of the milling tool necessarily cuts whatever lissajous shape is dictated by the relative periodic motions of the lathe head and milling table. See FIG. 6. The pins in the pin gear thus follow the grooves defined in the spherical body so that the rotation of the pin gear relative to the spherical body mimics the relative motions of the lathe head and milling table when the spherical body was cut.

Figure 7:
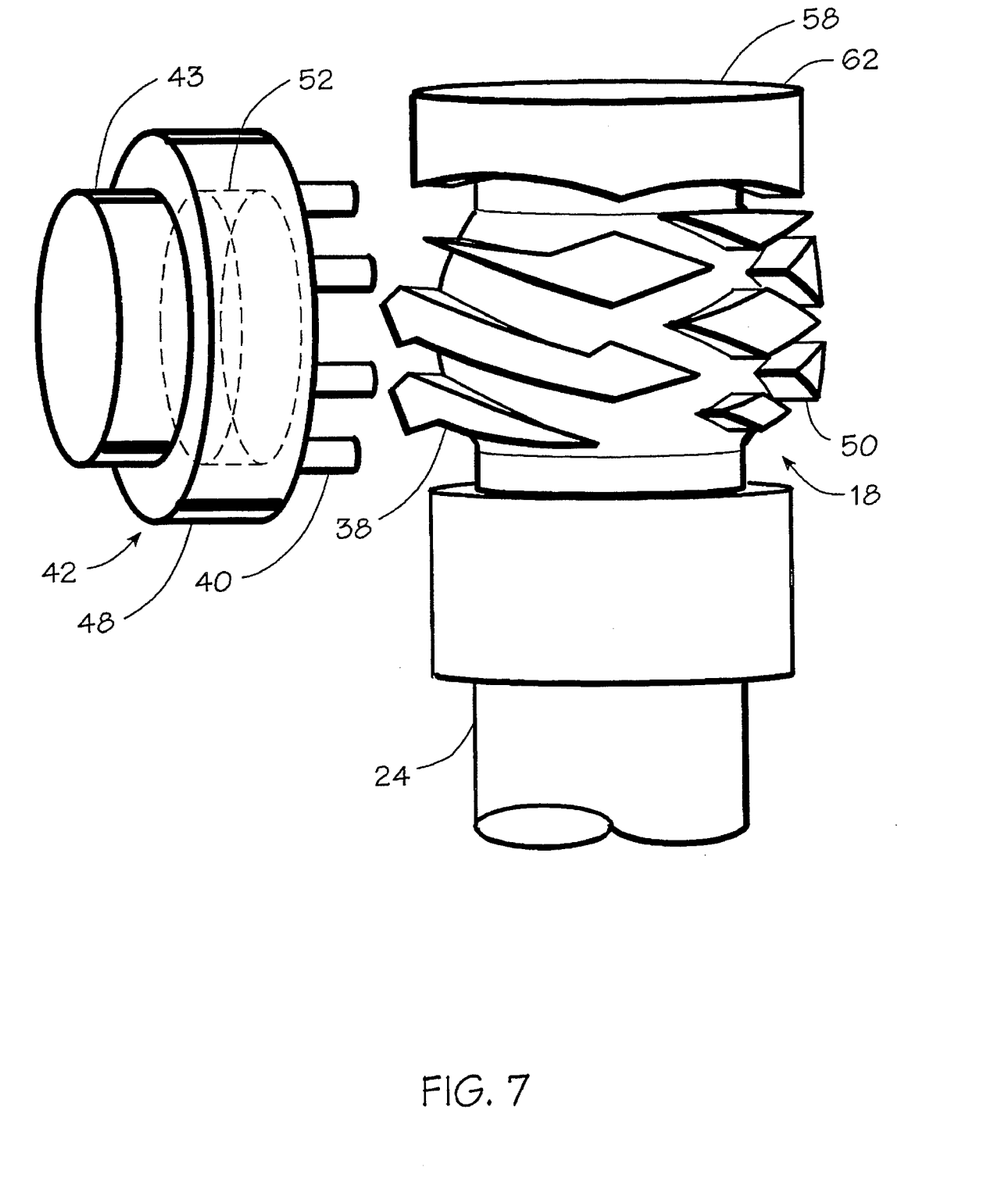
FIG. 7 is an elevational side view of a gear combination in which an agitating action is provided.

By this means virtually any motion may be programmed into computer 16 and cut into pineapple gear 18. Not only can different gear ratios be provided at different angles, but the sense of rotation may be varied. For example, pineapple gear 18 may rotate clockwise and pin gear may rotate either clockwise or counterclockwise in response depending on the pattern of grooves cut into head 22 pursuant to program control. Similarly, an agitating or reciprocating gear combination may be provided as shown in FIG. 7 in which pin gear 42 first rotates clockwise for a predetermined angular displacement during a first predetermined time and then reverses to rotate through an opposite predetermined angular displacment during a second predetermined time while pineapple gear 18 continuously rotates at a constant speed in one direction. Such agitation gears may be cut to execute any type of particular reciprocating motion, such as either constant speed or constant acceleration agitation or any desired control of any physical function of agitation or indexing.

Figure 1:
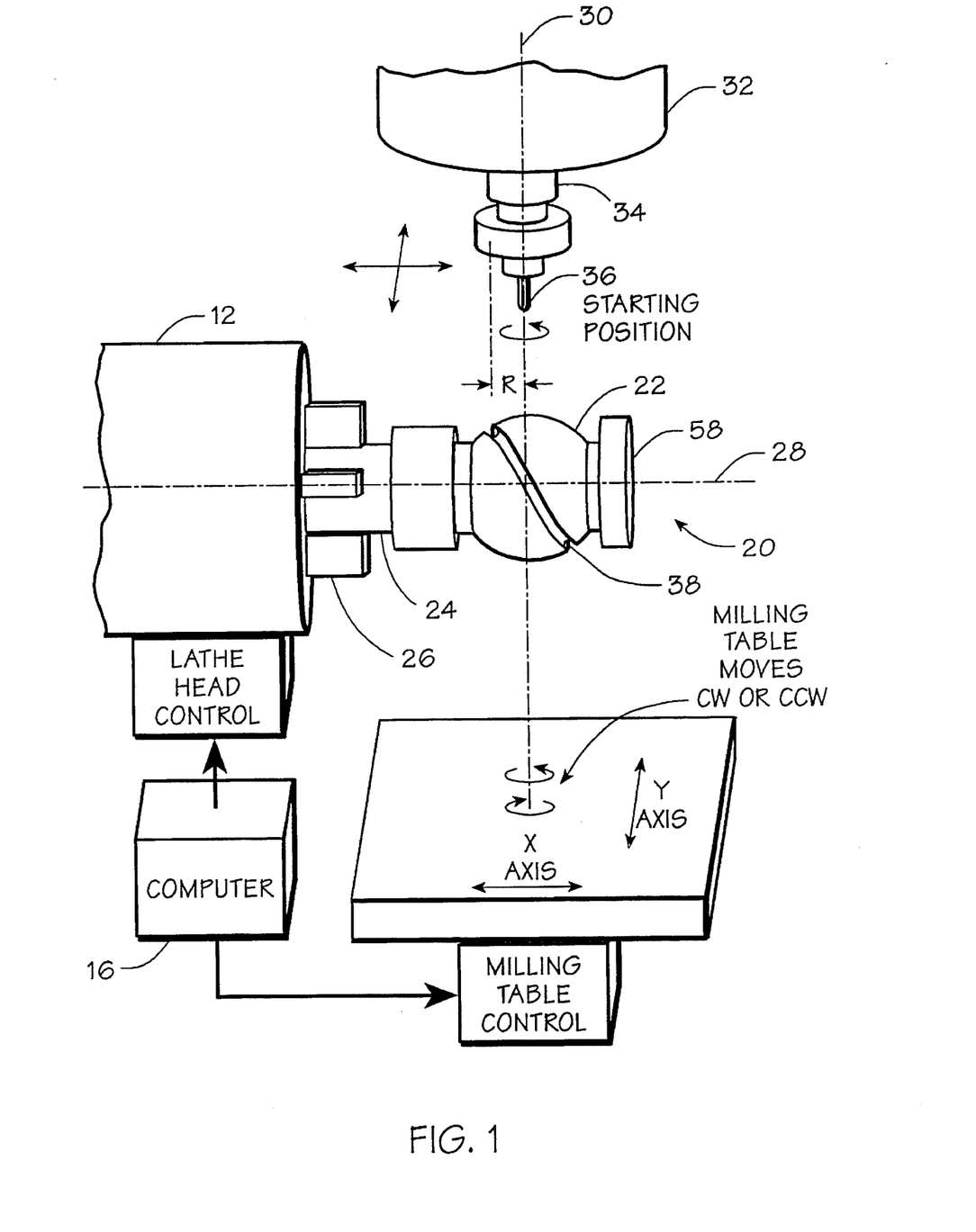
FIG. 1 is a diagrammatic depiction of apparatus used to cut the gearing of FIGS. 2–5b and generally with a design incorporating the invention.
Figure 2:
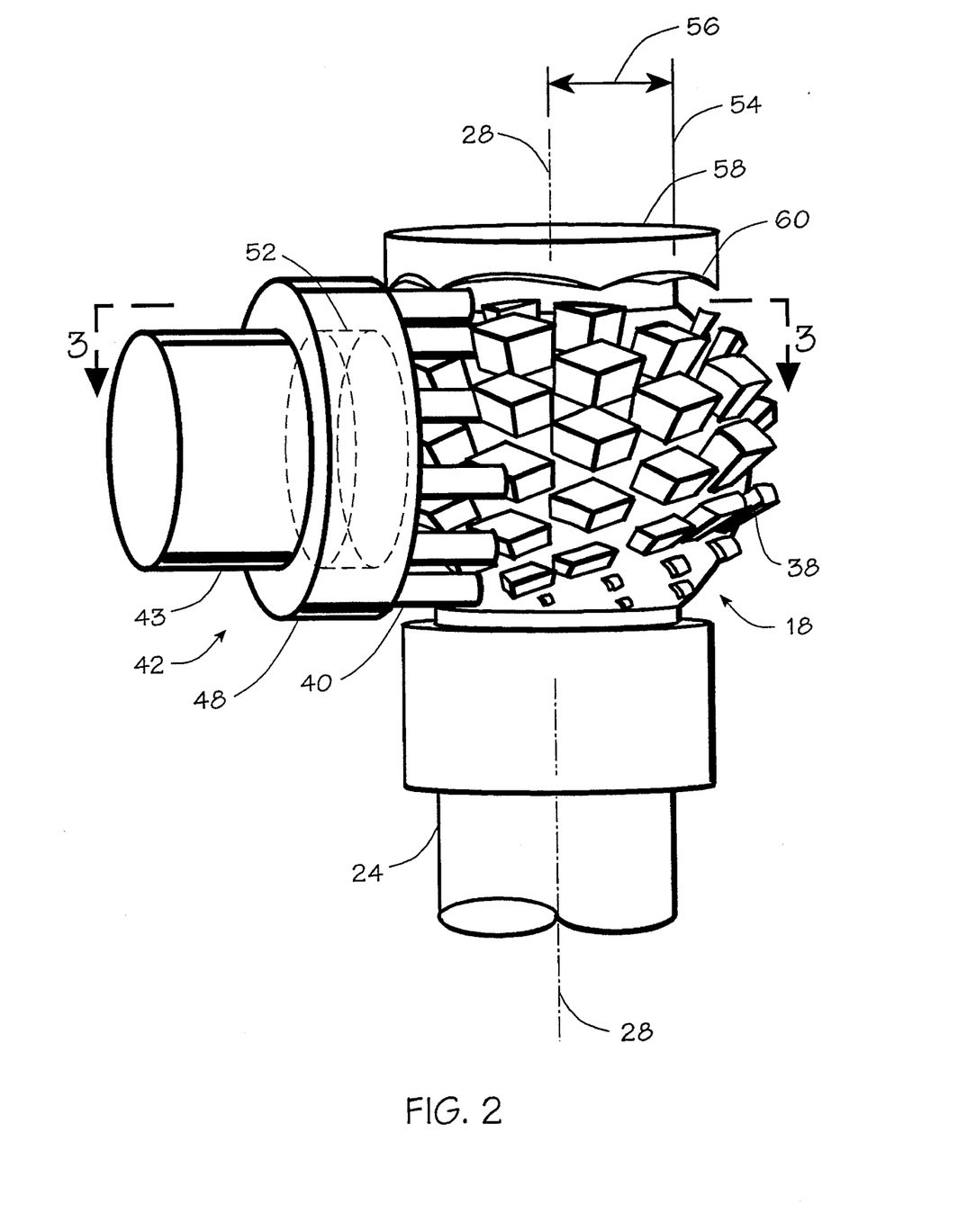
FIG. 2 is a perspective view of a first embodiment of the pineapple gear.
Figure 3:
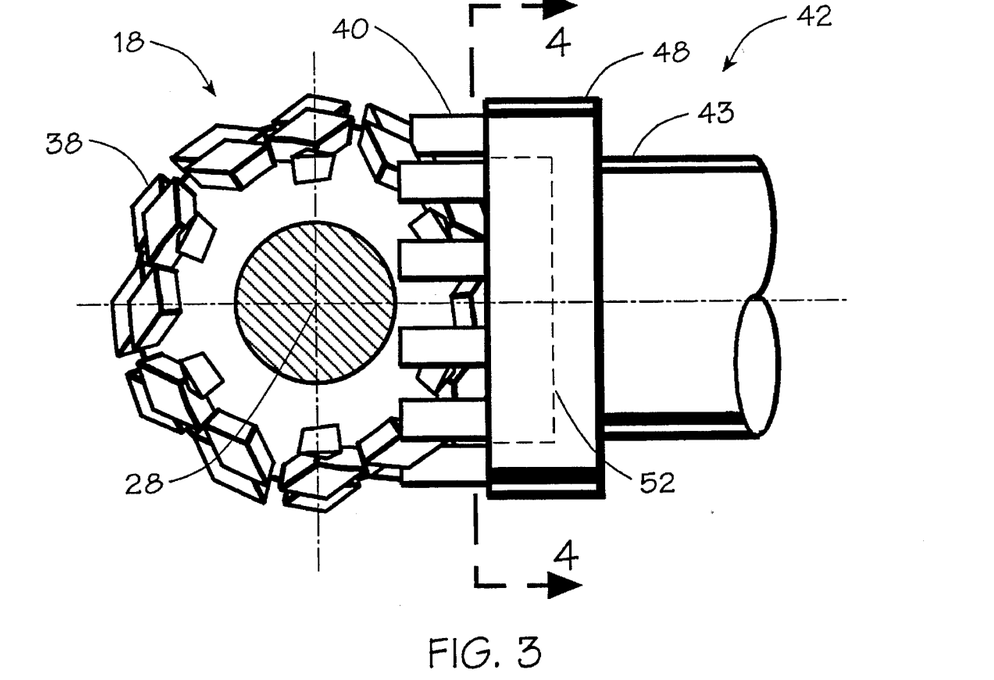
FIG. 3 is a top planned view of the pineapple gear and pin gear combination of FIG. 2.

The structure and operation of the pineapple gear and pin gear combination is most quickly and easily understood by first considering how the pineapple gear is cut as is diagrammatically depicted in FIG. 1. FIG. 1 is a highly simplified conceptual diagram of a computer controlled lathe head and milling machine or machine tool, generally denoted by reference numeral 10, such as manufactured by Boston Digital under the designation model 400 with fourth axis. Four axis machine tool 10 is comprised of a lathe head 12 and a milling table 14. Both lathe head 12 and milling table 14 are controlled in their rotation and movement by means of a computer 16. Four axis machine tool 10 is conventional and, thus, will not be further described in detail other than to illustrate how the pineapple gear, generally denoted by reference numeral 18, is fabricated. In the illustrated embodiment, pineapple gear 18 is cut from a blank 20 in FIG. 1, which is comprised of a spherical head 22 affixed to or integrally extending from a shaft 24. Blank 20 may be fabricated by any means now known or later devised and in the illustrated embodiment, is machined from aluminum, steel or other conventional materials from cylindrical stock. It is within the contemplation of the invention that blank 20 may be also fabricated for forging or molding.

Blank 20 is placed within chuck 26 of lathe head 12 so that spherical head 22 extends therefrom and is exposed in a position at which it can be accessed by milling head 32. Milling head 32, which includes a milling tool which rotates about its axis 30, is brought into an operative position to spherical head 22 by x and y movements of the milling table, which milling tool in the illustrated embodiment is at right angles to longitudinal axis 28 of blank 20. At the starting point axes 28 and 30 intersect each other at the center of spherical head 22. Longitudinal axis 28 is also collinear with the longitudinal axis of rotation of shaft 24 and spherical head 22. Thus, axis 30 of milling head 32 and axis 28 are approximately perpendicular to each other during the fabrication process. As discussed below any angle between axes 28 and 30 is included in the invention.

Milling table 14, which is translatable in the horizontal x and y axis, can be controlled to rotate or orbit around axis 30. A milling head, generally denoted by reference numeral 32, includes a motive means 34 for driving a milling bit 36. Milling tool 36 is conventional and may assume any shape, structure or type presently known or later determined to be effective in cutting spherical head 22.

Milling tool 36 is, thus, brought into contact with spherical head 22 at a distance R from the starting point by a table movement along eht x axis, and the machining process is begun. A groove 38 is cut into spherical head 22 along a path on or into its surface as determined by the rotation of lathe head 12 and milling table 14 as coordinated by a program stored within computer 16. Milling tool 36 operates independently at to cut away the material or metal of head 22. If the orbital speed of milling table 14 around axis 30 is coordinated with the rotational speed of lathe head 12 around axis 28 in a one-to-one ratio, then an inclined circle, such as depicted by groove 38 in FIG. 1 in head 22, is defined within head 22. For every single orbit of milling table 14, lathe head 12 will also make a single rotation, returning milling tool 36 to its initial position. If the movement of milling table 14 and lathe head 12 are not 1 to 1, then more complex shaped grooves will be cut into head 22. For example, where lathe head 12 makes two revolutions for every one orbit of milling table 14, groove 38 will be an endless, three dimensional, two looped figure, or a three dimensional lissajous curve drawn or in this case cut into the surface of a sphere.

It is expressly contemplated that any angle may be maintained between axes 28 and 30 in machine tool 10. If the ratio of the rates of rotation of lathe head 12 and milling table 14 is a rational fraction, milling tool 36 will always cut a three dimensional, periodic lissajous groove 38 into head 22 regardless of the angle between axes 28 and 30. There is no theoretical restriction of the angle between axis 28 and 30. In practice, the angle between axis 28 and 30, the diameter of head 22, the width of milling tool 36, and the ratio of the rates of rotation of lathe head 12 and of orbit of milling table 14 must be such that the lines of the resulting lissajous curve are not so close that there is insufficient material between grooves 38 to provide sufficient separation and strength of them. See FIG. 6. In the degenerate case where axes 28 and 30 are collinear, a pin and socket combination will result if the gearing ratio is 1 to 1, and concentric grooves will result at other ratios. Although a right angle between axes 28 and 30 is preferred and illustrated, any angle which allows well defined grooves 38 to be defined in sphere 22 is permitted. As will be seen in the discussion below, only a methodology which defines a groove 38 which brings a pin 40 on pin gear 42 back to an original starting position of tool 36 in groove 38 after one rotation of blank 20 will result in a usable gear.

Figure 4:
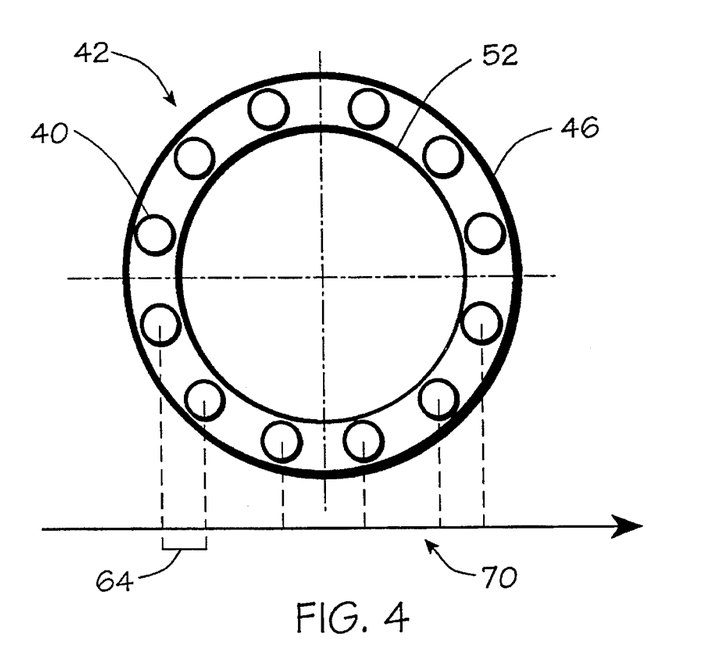
FIG. 4 is a cross sectional view of the pin gear of FIG. 3 as seen through section lines 4—4 of FIG. 3.

After a single endless groove 38 is cut, milling table 14 is horizontally translated under the control of computer 16 by a predetermined distance approximately equal to the spacing between pins 40 on pin gear 42 shown and described in greater detail in connection with FIGS. 2–5b. In other words milling table 14 will be translated in a predetermined direction by a distance equal to the projection of the pin-to-pin spacing on the line lying in the predetermined direction. FIG. 4 illustrates the principle. The pin-to-pin spacing 64 projected onto line 66 is smallest for the pins near the edges 68 and increases as one moves toward the center 70 of pin gear 42. More simply stated, milling table 14 is translated by the angular increment between each pin 40 on pin gear 42 while spherical head is maintained stationary. Milling tool 36 will then be correctly positioned to cut the next groove 38. If there are eight pins 40 on pin gear 42, then the angular increment between pins is 45 degrees. Milling table 14 is translated after cutting one endless groove to cut the next by translating milling table 14 by 45 degrees on the same radius R while keeping lathe head 12 stationary.

Milling tool 36, thus, in its translated position is then brought into contact with spherical head 22 and the process again repeated to cut a second groove (not shown) in spherical head 22 of blank 20. The process continues until a sufficient number of grooves 38 are cut into spherical head 22 to accommodate each of the pins 40 of pin gear 42. Thus, each groove 38 defined in pineapple gear 18 provides a meshing surface for at least two perhaps more pins 40 of pin gear 42 depending on the width and position of the groove on spherical head 22.

If a gear ratio were desired, then the rotation of lathe head 12 relative to the rotation of milling table 14 can be varied through the program having the control of computer 16. For example, it can be arranged that milling table 14 orbits twice as fast as lathe head 12 then providing a one-to-two gearing ratio between pineapple gear 18 and pin gear 42. Similarly, milling table 14 can be programmed to orbit half as fast as lathe head 12 providing a two-to-one ratio between pineapple gear 18 and pin gear 42. The gear ratios that may be obtained are arbitrary as long as they are rational ratios. This means that after an integral number of rotations of one of them, the other of them is returned through another integral number of rotations, which may be a different integer, to its initial state or position.

Figure 5A:
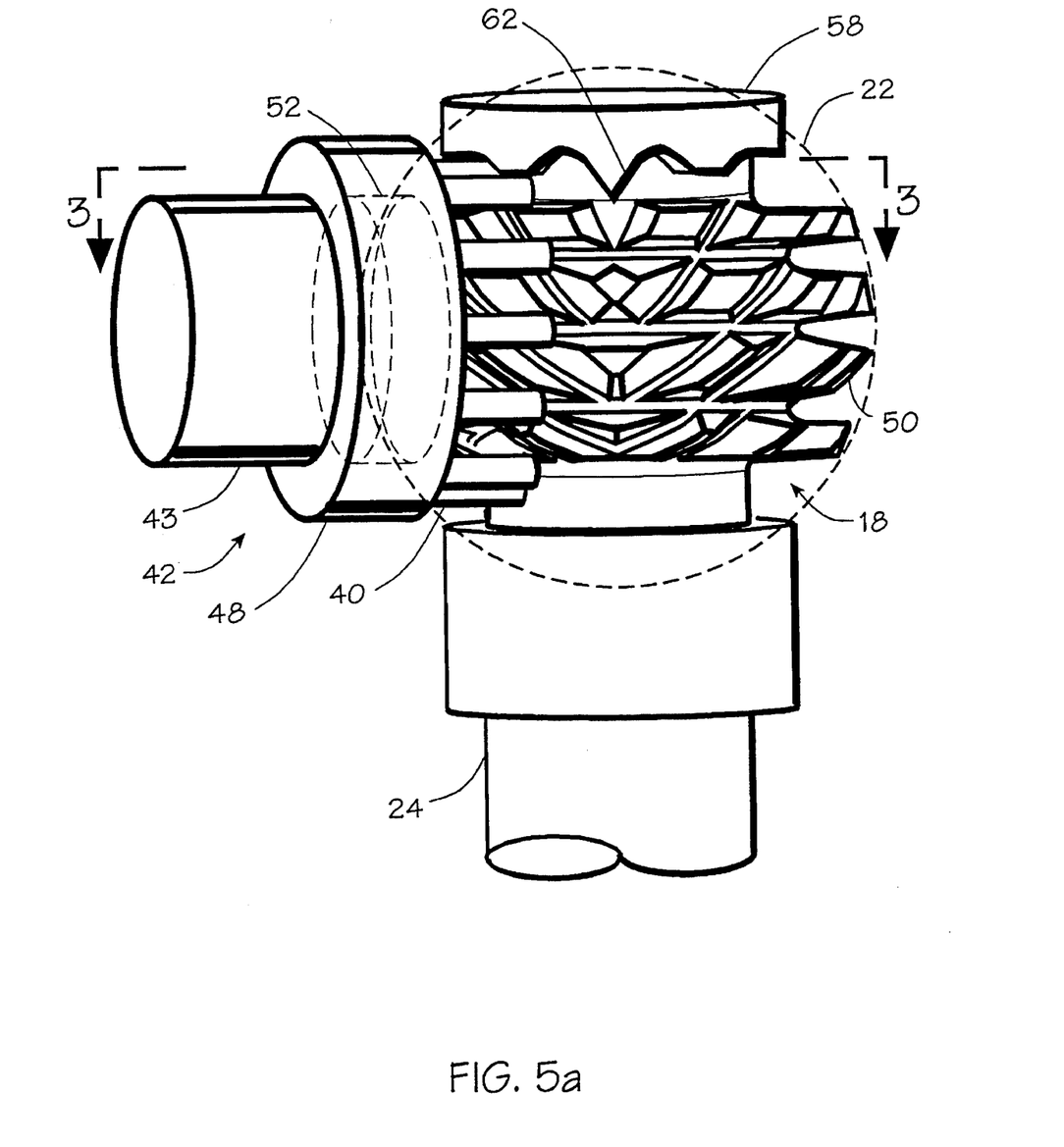
FIG. 5a is a side elevational view of a pineapple gear and pin gear combination in which Geneva movement has been cut.
Figure 5B:
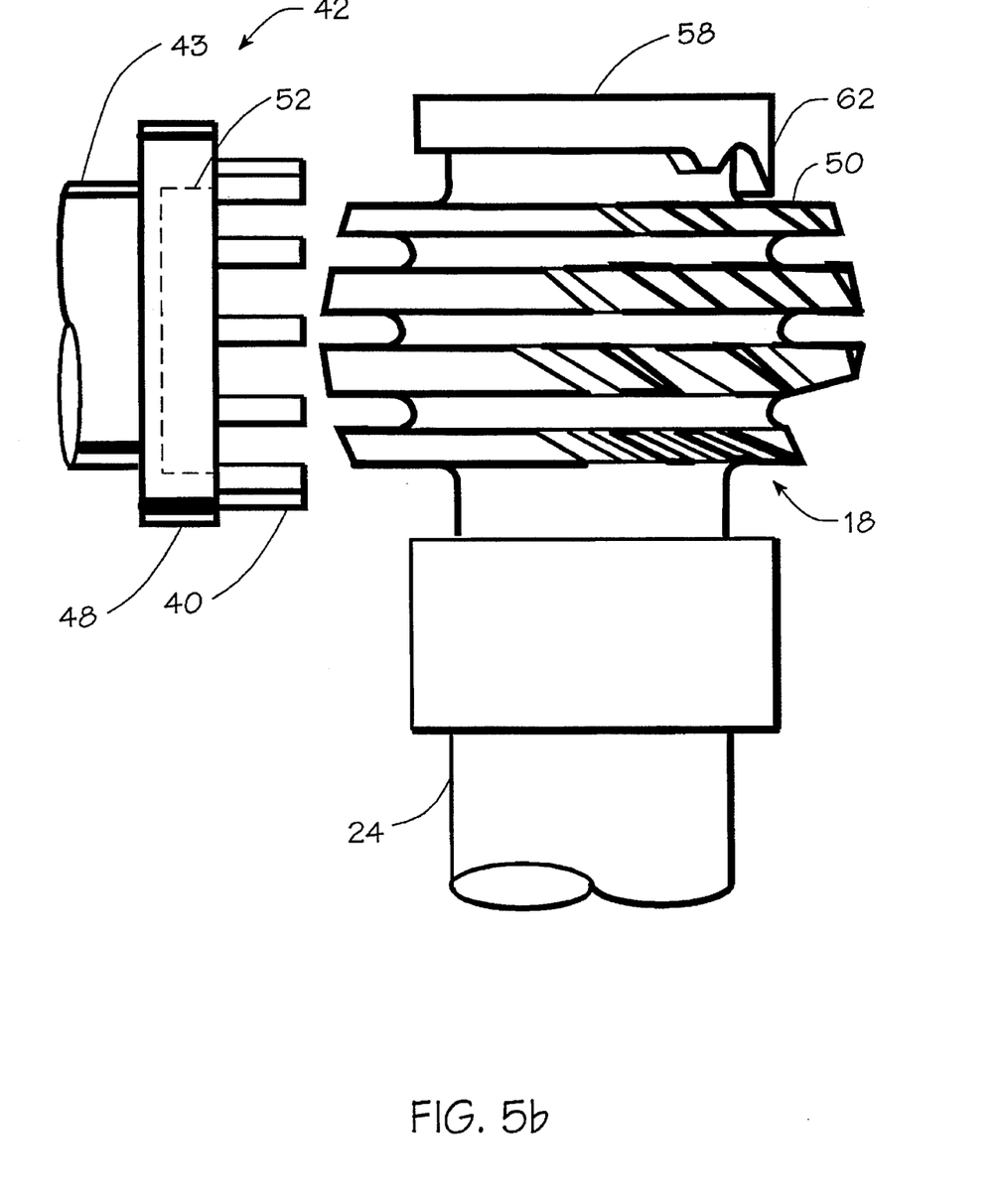
FIG. 5b is a side elevational view of the gear shown in FIG. 5a after the pineapple gear and pin gear have been rotated through a partial revolution so that the pin gear is engaged with the nonrotating portion of the Geneva cut in the pineapple gear.

It is also possible to provide the Geneva movement as illustrated in the embodiment of FIGS. 5a and 5b. In this case, machine tool 10 in FIG. 1, through programmatic control from computer 16, partially orbits milling table 14 while lathe head 12 continues to rotate. A portion of the lissajous cut is cut into spherical head 22 by milling tool 36 after which orbiting milling table 14 stops. Meanwhile, lathe head 12 continues to rotate spherical head 22 allowing milling tool 36 to cut a circumferential groove 44 depicted in FIG. 5b. It is only necessary to rotate pin gear 42 by an angular increment sufficient to bring the next tooth 40 into alignment with another one of horizontal grooves 44 on spherical head 22. For example, in the illustrated embodiment, pin gear 42 is provided with 12 teeth 40. These teeth, as shown in FIG. 4, are equally, and circumferentially spaced around the perimeter 46 of body 48 of pin gear 42. Therefore, the segment of lissajous grooves 38, which turn pin gear 42 and are shown as segments 50 in FIG. 5a, need only rotate pin gear 42 by an integral number of 1/12th parts of a revolution, or an integral multiple of 30 degrees, to ensure that pins 40 of pin gear 42 are correctly positioned on the other side of segments 50 to mesh with circumferential grooves 44. Clearly, the number of pins 40 and the number of grooves 38 provided in head 22 as well as the angular extent of segment 50 can be varied according to design objectives in a manner consistent with the invention. In the illustrated embodiment, there are five horizontal grooves 44 provided in head 22 with each groove providing a meshing surface for two pins 40 with the exception of the topmost and lowermost grooves 44, each of which carry three pins 40 as seen in FIG. 5b.

In the illustrated embodiment, pin gear 42 has a recessed section or cavity 52 defined into body 48 to allow the spherical extension of head 22 to extend therein without interfering contact. This is required since pins 40 extend into contact with the grooves 38 along a circle lying in a plane 54 shown in dotted outline in FIG. 2, lying parallel to axis 28, at a distance 56 from axis 28 as determined by the effective diameter of the circular arrangement of pins 40 on pin gear 42. This then allows the spherical envelope of head 22 to extend within the enclosure of pins 40 and actually into body 48 of pin gear 42 as is permitted by cavity 52.

First, it can be seen in the illustrated embodiment of the Figures that the diameter of pin gear 42 is less than the diameter of spherical head 22. It is conceivable that the reverse could be true, but in the preferred embodiment the diameter of pin gear 42 is always equal to or less than the diameter of head 22. This way all of pins 40 will remain in contact with grooves 38 defined in head 22 to facilitate smooth engagement between the two gears.

Second, the torque transfer of the gear combination can be varied by varying the relative diameters of pin gear 42 and head 22. If the diameter of head 22, for example, is twice that of pin gear 42, the torque applied to shaft 43 connected to pin gear 42 will be one half of that applied to shaft 24 driving pineapple gear 18. The gear ratio will need not necessarily change as the ratio of diameters of head 22 to pin gear 42 change. Therefore, it is a surprising result that for a given size of head 22, both gear ratios and torque ratios my be independently and arbitrarily changed without changing the overall space required by the gear combination.

In the illustrated embodiment a portion 58 of the cylindrical stock from which blank 20 is fabricated may be left in the position and integrally formed with spherical head 22. Thus, portion 58 forms a disk in the lower surface of which grooves or teeth may be cut which coact or form part of grooves 38 of pineapple head 18 as a result of the fabrication process described in connection with FIG. 1 and as illustrated by the slight scallop 60 in portion 50 of the embodiment to FIG. 2 and in the more pronounced tooth-like surfaces 62 in the Geneva gear movement of FIGS. 5a and 5b. These surfaces also assist in the engagement of pineapple gear 18 with pin gear 42.

The axis of rotation of the spherical body and the pin gear are shown in the illustrated embodiment as being at right angles. However, it is also within the scope of the invention that the angle between these two axes of rotation may be arbitrary. This is accomplished by orienting the axis rotation of lathe head 12 in an arbitrary angle with respect to the axis of rotation 30 of milling head 32. Milling tool 36 will then automatically cut the appropriately shaped groove into spherical body 22. A pin 40 of pin gear 42 subsequently put into the groove 38 thus cut will necessarily follow the same motion that milling tool 36 followed while lathe head 12 and milling table 14 were synchronously operated with their axes of rotation 28 and orbiting 30 respectively oriented at an arbitrary angle to each other. In this embodiment, disk 58 will be omitted and spherical body 22 will be completely formed to provide sufficient material on its crown or end into which groove 38 may be defined.

It can also be appreciated that pineapple gear 18 is supported or journalled only on shaft 24. No support, bearing or further journalling is required for support of portion 58 or the distal end of head 22. Similarly, pin gear 42 is also supported only on one end of shaft 43. Unlike bevel gears which may require four bearing surfaces to support the two bevelled gears, the pineapple gear and pin combination of the invention requires only a single bearing support for the shafts of each the two gears, pineapple gear 18 and pin gear 42. This is of considerable advantage in reduction of costs, parts and saving of space in applications where both are at a premium.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. A gear combination for rotating a first shaft with respect to rotation of a second shaft, said first and second shafts each having an axis of rotation, said axes of rotation intersecting each other at an angle comprising:

a pin gear coupled to and rotating about said first shaft, said pin gear having a plurality of pins extending therefrom parallel to said first shaft, said plurality of pins being even in number and symmetrically arranged on said pin gear so that each pin has a corresponding diametrically opposed pin disposed on said pin gear; and a spherical gear, which is comprised of an at least partially spherical body, and a plurality of grooves defined in said spherical body, which grooves are arranged and configured for engagement with said plurality of pins of said pin gear, said spherical gear being coupled to said second shaft, said plurality of grooves being curved wherever engagement between said pin gear and spherical gear cause relative rotation therebetween, both of said corresponding diametrically opposed pins being engaged with said grooves of said spherical body when said pin gear and spherical gear are rotating with respect to each other, whereby a compact gear combination is provided and whereby an arbitrary angle between said first and second shafts may be established.

2. The gear combination of claim 1 wherein said angle between said first and second shaft is a right angle.

3. The gear combination of claim 1 wherein each of said grooves defined in said spherical body receive at least two of said pins of said pin gear.

4. The gear combination of claim 1 wherein said grooves are defined in said spherical body such that said spherical gear rotates an integral number of times for an integral number of rotations of said pin gear.

5. The gear combination of claim 4 wherein said grooves are defined in said spherical body so that said pin gear rotates an integral number of times for an integral number of rotations of said spherical gear.

6. The gear combination of claim 1 where at least a portion of said grooves defined in said spherical body are perpendicular to said axis of said second shaft so that said pin gear partially rotates with each full rotation of said spherical gear.

7. The gear combination of claim 6 wherein said partial rotation of said pin gear with rotation of said spherical gear is a rational fraction of a single revolution of said pin gear for each revolution of said spherical gear.

8. The gear combination of claim 1 wherein substantially all of said plurality of pins are in engagement with said grooves in said spherical body at all times.

9. The gear combination of claim 1 wherein said pin gear is a driven gear and said spherical gear is a driving gear.

10. The gear combination of claim 1 wherein said pin gear is a driving gear and said spherical body is a driven gear.

11. The gear combination of claim 1 wherein said spherical body is provided with an end disk, said end disk being shaped to define one wall of at least one of said grooves.

12. A gear combination for rotating a first shaft with respect to rotation of a second shaft, said first and second shafts each having an axis of rotation, said axes of rotation intersecting each other at an angle comprising:

a pin gear coupled to first shaft and having a first diameter, said pin gear having a plurality of pins extending from said pin gear wherein each pin is equidistant from a center of said first shaft and therefore lying on a circle; and an at least partially spherical body having at least one arbitrarily selected lissajous groove defined in spherical body and having a second diameter, which groove is arranged and configured for engagement with at least one of said plurality of pins of said pin gear to provide an endless path for each of said plurality of pins in which said path each pin will travel until ultimately returning to a corresponding initial relative position of said pin gear and said spherical body, said spherical gear being coupled to said second shaft, whereby a compact gear combination is provided.

13. The gear combination of claim 12 where said first and second diameters are unequal to define a torque conversion between said pin gear and said spherical body.

14. The gear combination of claim 12 where said lissajous groove defines a gear ratio between said pin gear and said spherical body.

15. The gear combination of claim 12 where said angle between said first and second shafts is not a right angle.

16. The gear combination of claim 12 where said pin gear has a plurality of pins, a plurality of lissajous grooves, and wherein substantially all of said plurality of pins are always in engagement with said lissajous grooves defined in said spherical body.

17. The gear combination of claim 12 where said lissajous groove defines an indexing motion between said pin gear and said spherical body.

18. The gear combination of claim 12 where said lissajous groove defines a selectively rotation of said pin gear and said spherical body in a selected sense with respect to each other.

19. The gear combination of claim 12 where said lissajous groove defines an arbitrarily selectively programmed relative motion between said pin gear and said spherical body.

20. A gear combination for rotating a first shaft with respect to rotation of a second shaft, said first and second shafts each having an axis of rotation, said axes of rotation intersecting each other at an angle comprising:

a pin gear coupled to first shaft and having a first diameter, said pin gear having at least one pin extending therefrom; and an at least partially spherical body having at least one lissajous groove defined in said spherical body and having a second diameter, which groove is arranged and configured for engagement with said pin of said pin gear, said spherical gear being coupled to said second shaft, where said lissajous groove defines a reciprocating motion between said pin gear and said spherical body whereby a compact gear combination is provided.

* * * * *